United States Patent [19]
Teramae

[11] Patent Number: 5,957,259
[45] Date of Patent: Sep. 28, 1999

[54] CLUTCH COVER ASSEMBLY CONNECTING ELEMENT

[75] Inventor: Hiroshi Teramae, Neyagawa, Japan

[73] Assignee: EXEDY Corporation, Neyagawa, Japan

[21] Appl. No.: 08/893,585

[22] Filed: Jul. 11, 1997

[30] Foreign Application Priority Data

Jul. 17, 1996 [JP] Japan ..................................... 8-187501

[51] Int. Cl.⁶ ................................................. F16D 13/50
[52] U.S. Cl. ................................... 192/70.19; 192/70.28; 192/89.23
[58] Field of Search ............................ 192/70.19, 70.27, 192/70.28, 89.23

[56] References Cited

U.S. PATENT DOCUMENTS

| 3,773,155 | 11/1973 | Fujita et al. | 192/70.28 X |
|---|---|---|---|
| 5,325,948 | 7/1994 | Prud'Homme | 192/70.28 X |
| 5,377,803 | 1/1995 | Link et al. | 192/89.23 X |

FOREIGN PATENT DOCUMENTS

| 3330342 | 3/1985 | Germany | 192/70.19 |

*Primary Examiner*—Richard M. Lorence
*Attorney, Agent, or Firm*—Shinjyu An Intellectual Property Firm

[57] ABSTRACT

A clutch cover assembly 3 includes a clutch cover 12, a pressure plate 10, a pin 33, a diaphragm spring 11 and a coil spring 34. The pin 33 extends in an axial direction and its one end is fixed to at least one of the flywheel 1 and the clutch cover 12. The pin 33 also connects with the pressure plate 10 in a manner such that relative rotation between the pressure plate 10 and the clutch cover 12 is restricted but limited axial movement is possible.

A diaphragm spring 11, supported by the clutch cover 12, presses the pressure plate 10 toward the flywheel 1. The coil spring 34 is a mechanism which release the pressure plate 10 from the flywheel 1 side, when the diaphragm spring 11 stops pressing the pressure plate 10.

12 Claims, 7 Drawing Sheets

CLUTCH COVER ASSEMBLY CONNECTING ELEMENT

BACKGROUND OF THE INVENTION

A. Field of the Invention

The present invention relates to a clutch cover assembly to disengage a clutch disk from a flywheel.

B. Description of Related Art

In general, a clutch cover assembly, which is used in, for instance, automobile clutches, includes a pressure plate which presses a friction facing of a clutch disk against a flywheel of an engine. The clutch cover assembly usually includes a clutch cover which surrounds and supports the pressure plate, and a diaphragm spring which biases the pressure plate into engagement with the friction facing of the clutch disk.

A outer circumferential part of the clutch cover is typically bolted or attached in some way to an outer circumferential portion of the flywheel. The pressure plate is coupled to the clutch cover by a coupling mechanism in a manner such that relative rotation between the pressure plate and the clutch cover is restricted but limited axial movement of the pressure plate is possible.

A plurality of coupling mechanisms described above are positioned at spaced apart intervals in a circumferential direction along the outer circumferential portion of the clutch cover assembly. Typically, each mechanism is composed of a strap plate which extends in a direction tangent to an outer periphery of the clutch cover. The strap plate is made of an elongated plate-like elastic body, one end being attached to the clutch cover and the other end being attached to the pressure plate. By this mechanism, the pressure plate can rotate together with the clutch cover. For ideal function and positioning of the strap plates, openings are formed at the outer circumferential portions of the clutch cover to accommodate the strap plates.

For ideal operation, each of the strap plates must couple the clutch cover to the pressure plate in a circular direction as described above, but also, when disengaging the clutch, must bias the pressure plate away from engagement with the friction facing of the clutch disk. Therefore, each of the strap plates must have a predetermined circumferential length, with respect to the pressure plate and clutch cover, to provide adequate biasing force.

One problem with strap plates as currently used in the art is that the openings in the clutch cover that accommodate the strap plates must have a relatively large circumferential length in order to correspond to the relative length of the strap plate. As the result, the clutch cover may be weakened due to the discontinuities associated with the openings. The clutch cover, in some applications, may develop cracks or undergo slight deformation due in part to centrifugal forces.

In addition, the clutch cover provides a annular fulcrum about which the diaphragm spring pivots. There is a possibility that, due to its insufficient strength, the clutch cover may undergo slight deformation resulting in mis-alignment of the position of the fulcrum. Therefore, the performance of the clutch during engagement and disengagement may be diminished.

On the other hand, when a strap plate having a short circumferential length is used, the circumferential length of the opening may be reduced thus improving the strength of the clutch cover. However, in this case, the shorter strap plate has a greater possibility of undergoing significant deformation and bending and the pressure plate moves back and forth between engagement and dis-engagement with the friction surface of the clutch disc. Therefore, the shorter strap plate may prematurely wear as a result of fatigue.

SUMMARY OF THE INVENTION

One object of the present invention is to increase the strength of a clutch cover by improving a coupling mechanism which connects a clutch cover with a pressure plate.

In accordance with one embodiment of the present invention, a clutch cover assembly is configured for connected to a flywheel in a clutch mechanism. The clutch cover assembly includes a clutch cover fixed to a flywheel. A pressure plate is disposed inside the clutch cover. The pressure plate is formed with a friction surface facing the flywheel. A connecting element extends in a generally axial direction. One end of the connecting element is supported by either the flywheel or the clutch cover. The connecting element extends through a portion of the pressure plate restricting relative rotation between the clutch cover and the pressure plate, and allowing axial movement of the pressure plate with respect to the clutch cover. A diaphragm spring is disposed in the clutch cover between the clutch cover and the pressure plate, the diaphragm spring biasing the pressure plate toward the flywheel. A releasing mechanism is supported in the clutch cover, the releasing mechanism configured to move the pressure plate away from the flywheel in response to movement of the diaphragm spring.

Preferably, the connecting element is a pin which extends in an axial direction and extends into an opening formed in the flywheel.

Preferably, the connecting element is a pin which extends in an axial direction and extends through an opening formed in the clutch cover and the pin is caulked against one surface of the clutch cover.

Preferably, the portion of the pressure plate is a radially extending portion formed with an aperture, the connecting element extending through the aperture.

Preferably, the clutch cover is formed with a depression and one end of the connecting element is retained in the depression.

Preferably, the connecting element is a pin fixed to the clutch cover. The pin is formed with a seat configured to engage the flywheel and a spring is disposed between the portion of the pressure plate and the seat biasing the seat into engagement with the flywheel thus urging the pressure plate away from the flywheel.

Preferably, the connecting element is a pin fixed to the clutch cover and the pin is configured to extend into a hole formed in the flywheel, the releasing mechanism comprises an elastic element disposed about the pin biasing the pressure plate away from the flywheel.

Preferably, the elastic element is a coil spring.

Preferably, the elastic element is a rubber-like block formed with an aperture through which the pin extends.

Preferably, the elastic element is an undulated spring formed with a plurality of apertures through which the pin extends.

Preferably, the elastic element includes a plurality of conical springs stacked end to end such that a large end of one of the conical springs engages a large end of an adjacent one of the conical springs and a small end of one of the conical springs engages a small end of one of the conical springs.

Preferably, the connecting element is a pin fixed to the clutch cover and the pin is configured to extend into a hole formed in the flywheel. The releasing mechanism includes a clip fixed to the pressure plate, the clip extending around a portion of the diaphragm spring such that movement of the diaphragm spring and movement of the pressure plate are synchronous due to engagement with the clip.

Preferably, outer circumferential portions of the clutch cover are formed with at least one opening open to a radially outward side of the clutch cover, and the portion of the pressure plate extends into the opening.

These and other objects, features, aspects and advantages of the present invention will become more fully apparent from the following detailed description of the present invention when taken in conjunction with the accompanying drawings where like reference numerals denote corresponding parts throughout.

DETAILED DESCRIPTION OF THE PREFERRED EMBODIMENT

First Embodiment

Figure 1:
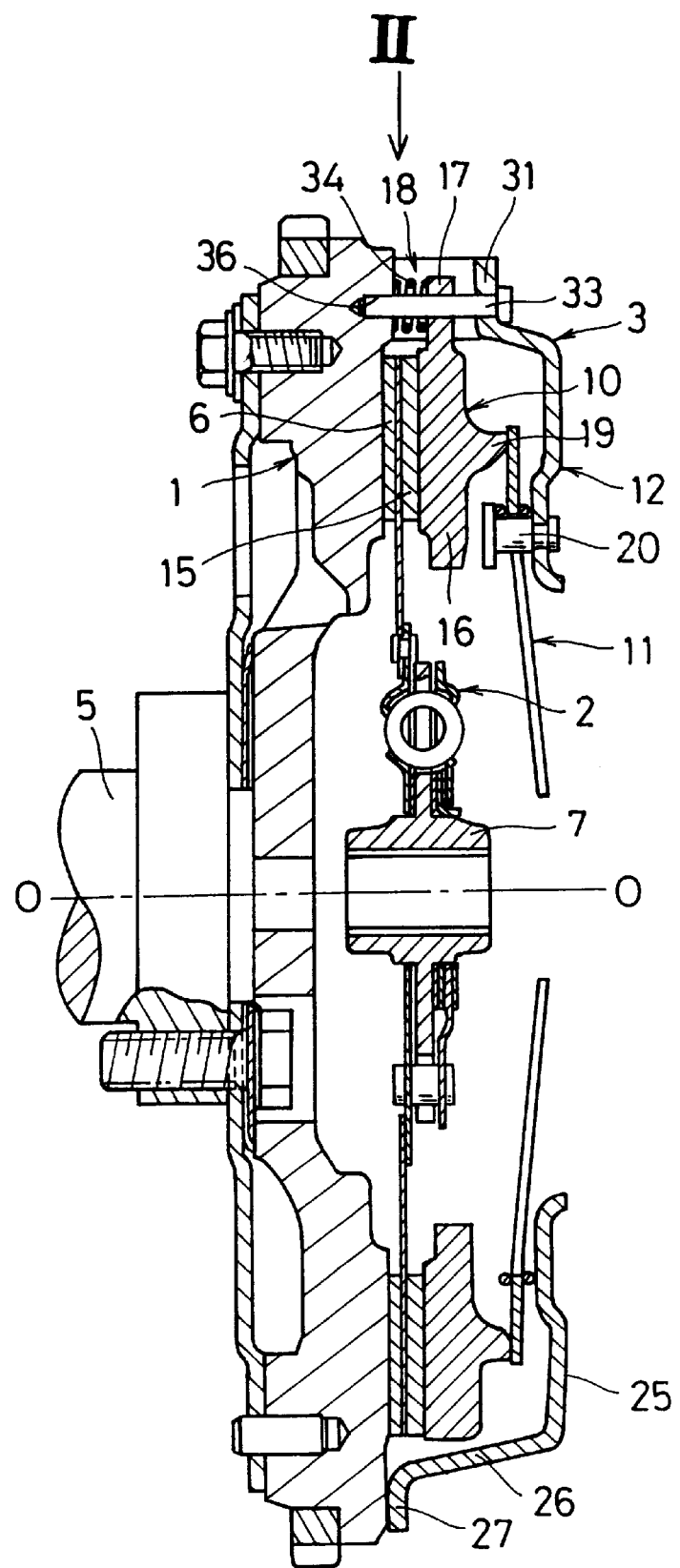
FIG. 1 is a fragmentary side section showing a clutch device in accordance with the first embodiment of the present invention.

FIG. 1 is a fragmentary side section showing a clutch device in accordance with a first embodiment of the present invention. In FIG. 1, a clutch device has a flywheel 1, a clutch disk assembly 2, and a clutch cover assembly 3.

The flywheel 1 is fixed to the end part of a crank shaft 5 of an engine (not shown). The clutch disk assembly 2 has a friction facing 6 at the outer circumferential part. A spline hub 7 at the inner circumferential part of the clutch disk assembly 2 is coupled to a main shaft (the center line O—O of the main shaft is shown in FIG. 1) of a transmission (not shown).

The clutch cover assembly 3 has a pressure plate 10, a diaphragm spring 11 and a clutch cover 12, all of which have a annular shape and are concentrically positioned with respect to the main shaft (center line O—O) of transmission.

The pressure plate 10 has a main annular part 16 with a friction surface 15, a plurality of projecting parts 17 (only one is shown in FIG. 1) which extends in a radially outward direction from an outer circumference of the main annular part 16, and an annular projection 19 which extends in an axial direction away from friction surface 15 of the main annular part 16. The friction surface 15 faces the friction facing 6 of the clutch disk assembly 2, in another words, faces a friction surface of the flywheel 1 beyond the friction facing 6. The projecting part 17 is coupled to the flywheel 1 and the clutch cover 12 by a coupling mechanism 18 which is described below.

The diaphragm spring 11 is positioned between the pressure plate 10 and the clutch cover 12. An outer circumferential part of the diaphragm spring 11 contacts the annular projection 19. A radially intermediate part of the diaphragm spring 11 is supported by the clutch cover 12 via a fulcrum mechanism 20. The inner circumferential part of the diaphragm spring 11 is configured to contact a release bearing (not shown in FIG. 1).

The clutch cover 12 covers the outer circumferential periphery and the back of the pressure plate 10 and the diaphragm spring 11. The clutch cover 12, which may made by a molding press, has an annular disk part 25 which extends in a radial direction, a cylinder-like wall part 26 which extends from the outer circumference of the disk part 25 toward the flywheel 1, and a flange part 27 which extends outward in a radial direction from the front end of the cylinder-like wall part 26. The flange part 27 is fixed to the outer circumferential part of the flywheel 1 by locating pins and location bolts (not shown).

Figure 2:
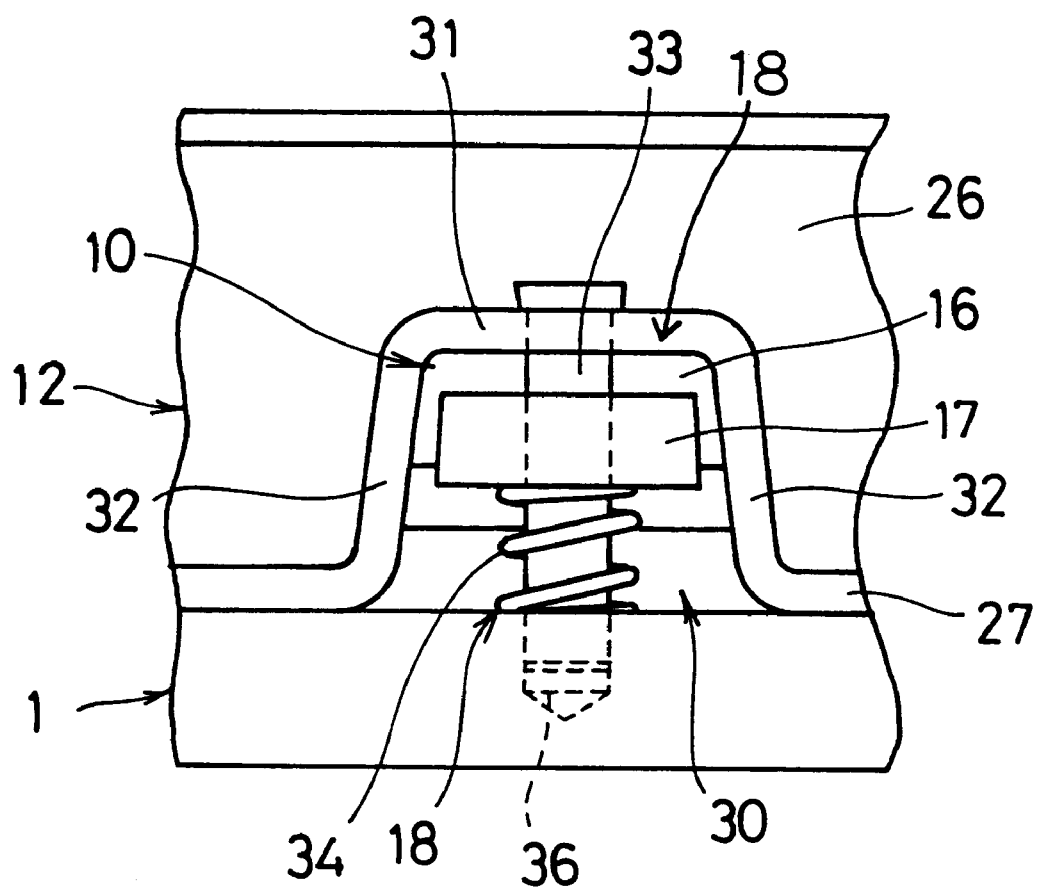
FIG. 2 is a fragmentary side view of a portion of the clutch device shown in FIG. 1, looking in the direction of the arrow II.

FIG. 2 is a view from the arrow II in FIG. 1. The coupling mechanism 18 is described in detail as follows, with reference to FIGS. 1 and 2.

There are a plurality of openings 30 along the outer circumferential part of the clutch cover 12, each of which is open toward the flywheel 1 and contains a projecting part 17 and a coupling mechanism 18 as shown in FIG. 2. The openings 30 extend through the cylinder-like wall part 26 of the clutch cover 12 such that the openings 30 extend into the interior of the clutch cover 12 and thus the pressure plate 10 is visible in FIG. 2.

The flange part 27 is bent to define an apron part 31 and side walls 32. The apron part 31 and the side walls 32 further define the opening 30. The apron part 31 and the side walls 32 are continuously formed with the flange part 27.

The coupling mechanism 18 includes a pin 33 which extends in an axial direction, and a coil spring 34 that is disposed around the pin 33. A front end of the pin 33 is force fitted into a hole 36 of the flywheel 1, and the intermediate part of the pin 33 extends through a hole formed in the projecting part 17 of the pressure plate 10 in a manner that allows the pressure plate 10 to slide freely in the axial direction with respect to the pin 33. A rear end of the pin 33 is fitted in a hole of the apron part 31, and the end part of the pin 33 projecting from the hole is caulked (deformed) against the apron part 31. The coil spring 34 extends between the flywheel 1 and the projecting part 17 such that the pressure plate 10 is biased by the coil spring 34. Ends of the coil spring 34 engage a surface of the flywheel 1 and a surface on the projecting part 17.

An operation of the first embodiment is provided below. In FIG. 1, in engaging the clutch, the diaphragm spring 11 forces the pressure plate 10 to press the friction facing 6 of the clutch disk assembly 2 against the flywheel 1. In engaging the clutch, the coil spring 34 is compressed between the projecting part 17 and the flywheel 1. In disengaging the clutch, the inner circumferential part of the diaphragm spring 11 is pushed forward (toward the flywheel 1) by a release bearing not shown in FIG. 1, as a result, the outer circumference of the diaphragm spring 11 moves way from the flywheel 1 to release the pressure plate 10 from with the friction facing 6.

In the operation mentioned above, the coupling mechanism 18 in FIG. 2 works as follows. The pressure plate 10 always rotates together with the flywheel 1 and the clutch cover 12 due to the pin 33. Such co-rotation is enabled by connecting the projecting part 17 of the pressure plate 10 with the flywheel 1 and the clutch cover 12 by the pin 33.

In disengaging the clutch, it is desirable to force the pressure plate 10 to move back away from the friction facing 6. Such movement of the pressure plate 10 is enabled by the biasing force of the coil spring 34 which pushes on the projecting part 17.

Although centrifugal force is applied to the clutch cover 12 during the operation described above, the first embodiment is such that reduction in strength minimized due to the configuration of the opening 30 in the clutch cover 12. In another words, since the opening 30 has a circumferential length and axial depth only as large as necessary to support the pin 33 and accommodate the projecting part 17 in which the pin 33 is fitted, the size, especially the circumferential direction, of the opening 30 is minimized, and the opening 30 does not decrease the strength and rigidity of the whole clutch cover 12 as much as the prior art configurations. As the result, damage and deformation to the clutch cover 12 by centrifugal forces minimized. On the other hand, although the stress transmitted from the diaphragm spring 11 via the fulcrum mechanism 20 is applied locally to the clutch cover 12, it does not deform the clutch cover and the location in an axial direction of the fulcrum mechanism 20 is kept constant because of the significant rigidity of the clutch cover 12 as described above. As the results, the performance of the diaphragm spring 11 during engagement and disengagement of the clutch is assured and, the variations and malfunctions are prevented.

Second Embodiment

Figure 3:
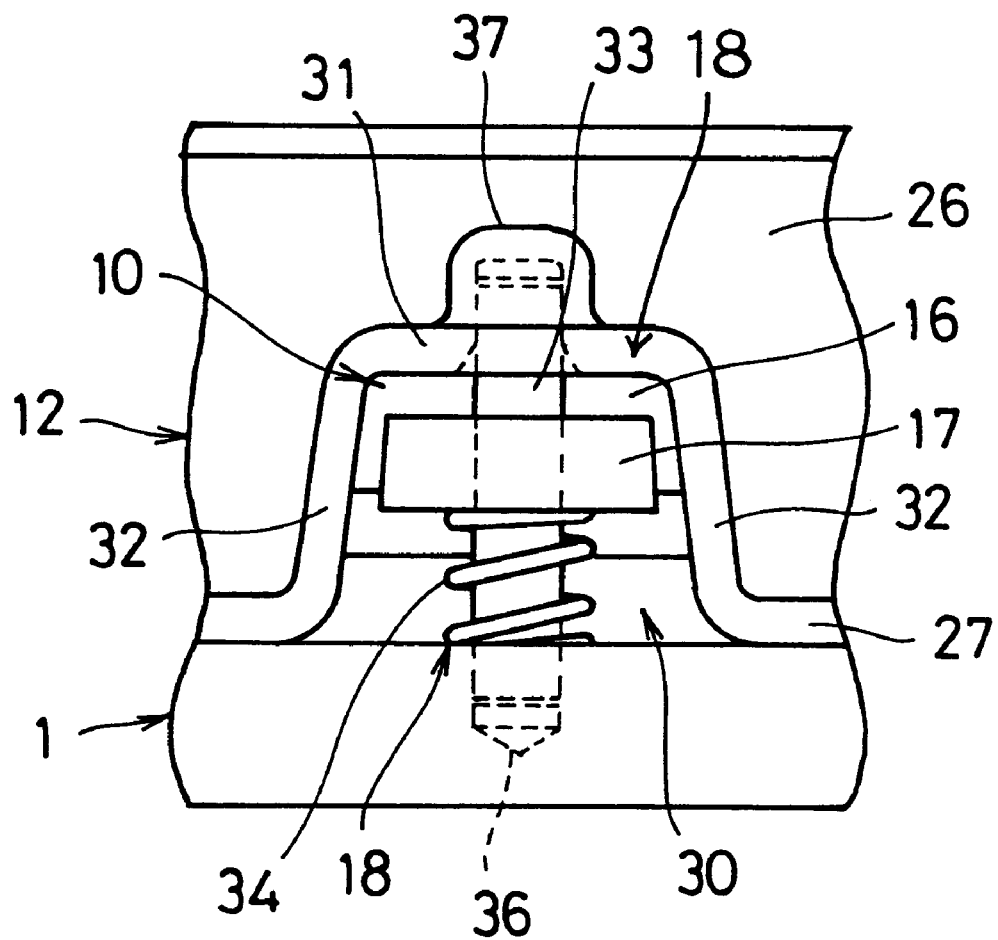
FIG. 3 is a fragmentary view similar to FIG. 2 showing a second embodiment of the present invention.

A second embodiment is shown in FIG. 3, a depression 37 which extends away from the flywheel 1 is formed in the apron part 31 of the clutch cover 12. The end part of the pin 33 is fitted in the hole of the dent 37. In this structure, it is not necessary for the pin 33 to be fitted firmly in the depression 37, but the pin 33 is positioned in the depression 37 in a manner so as not to move in a circumferential direction with respect to the apron part 31.

Third Embodiment

Figure 4:
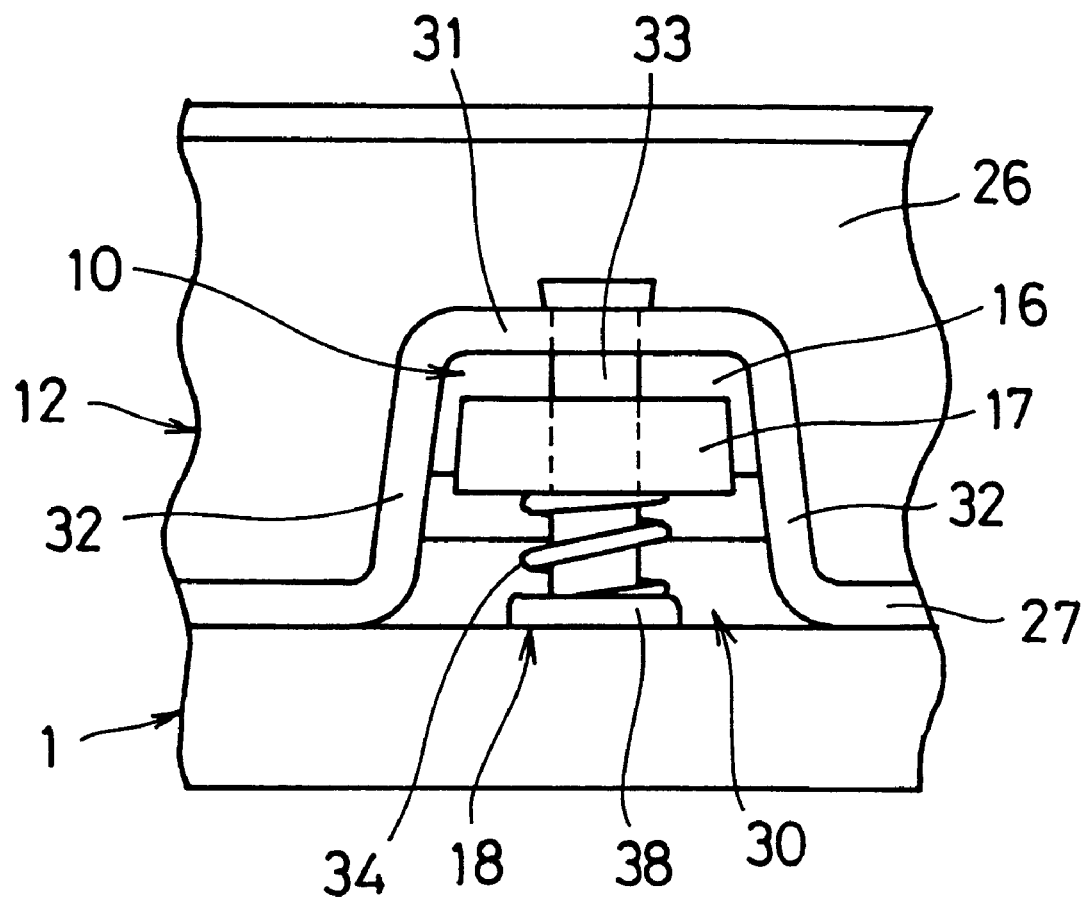
FIG. 4 is a fragmentary view similar to FIG. 2 showing a third embodiment of the present invention.

A third embodiment is shown in FIG. 4, in which the flywheel 1 is not formed with the hole 36 such as is shown in FIGS. 2 and 3, but rather the pin 33 is formed with a front end part 38 having a relatively larger diameter. The front end part 38 contacts on the surface of the flywheel 1 and the spring 34 is retained between the projecting part 17 and the front end part 38.

Fourth Embodiment

Figure 5:
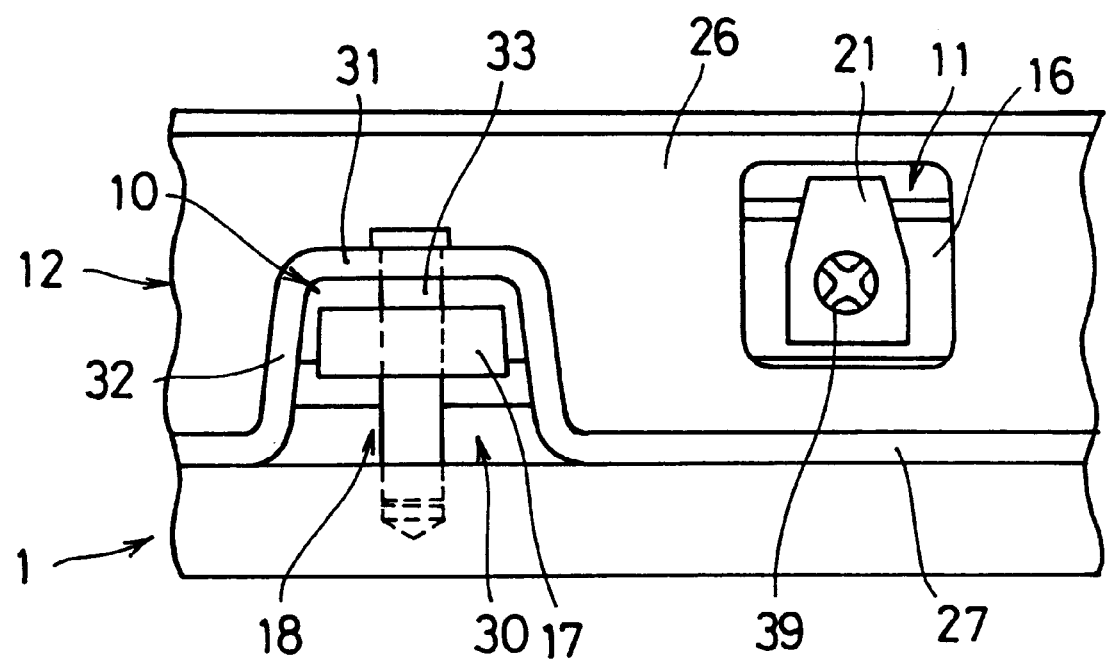
FIG. 5 is a fragmentary view similar to FIG. 2 showing a fourth embodiment of the present invention.

As shown in FIG. 5, a fourth embodiment of the present invention does not have a coil spring 34 such as the spring shown in FIGS. 2, 3 and 4. Instead of the coil spring 34, the embodiment uses a clip 21 as a mechanism by which the pressure plate 10 is biased. A plurality of clips 21 are placed at spaced apart intervals in a annular direction near the outer circumference of the diaphragm spring 11. The clip 21 is a small element being made of a plate-like spring. One end of the clip 21 is fixed to the outer circumferential part of the pressure plate 10 by a bolt 39, and the curved part of the other end sits on the outer circumferential part of the diaphragm spring 11 from the opposite side of the projection 19. The diaphragm spring 11 is thus engaged on one side by the clip 21 and engaged on its other side by the pressure plate 10. Therefore, the pressure plate 10 continuously follows the movement of the diaphragm spring 11. In disengaging the clutch, when the outer circumferential part of the diaphragm spring 11 moves in a direction to leave the flywheel 1, the pressure plate 10 also moves in the same direction via engagement with the clip 21.

Fifth Embodiment

Figure 6:
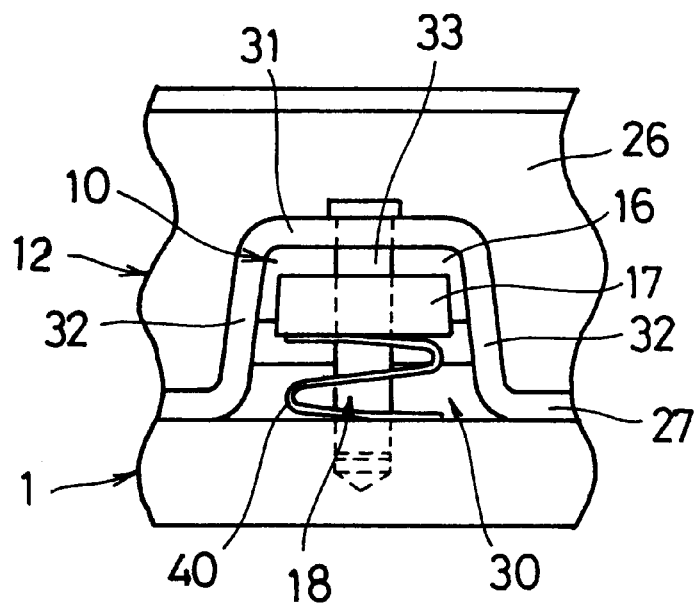
FIG. 6 is a fragmentary view similar to FIG. 2 showing a fifth embodiment of the present invention.

As shown in FIG. 6, in a fifth embodiment of the present invention, the coil spring 34 is replaced by an S-form or undulated plate spring 40 which is placed between the projecting part 17 and the flywheel 1. The plate spring 40 is formed with a plurality of holes through which the pin 33 extends.

Sixth Embodiment

Figure 7:
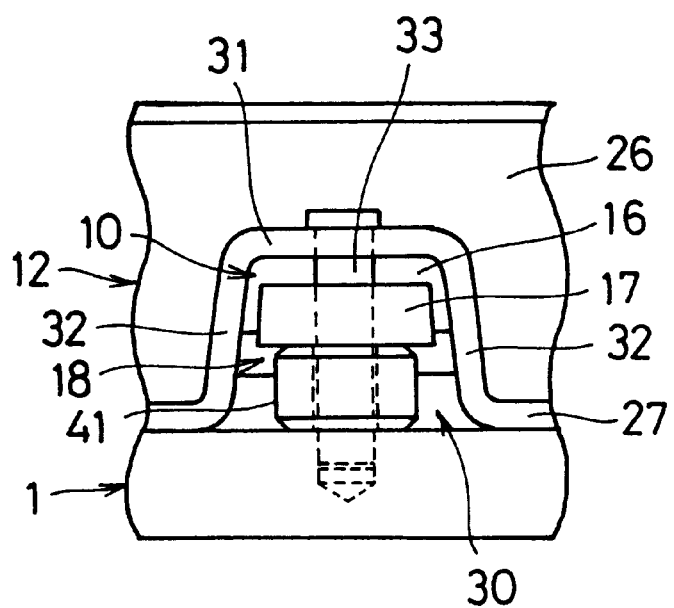
FIG. 7 is a fragmentary view similar to FIG. 2 showing a sixth embodiment of the present invention.

As shown in FIG. 7, a sixth embodiment of the present invention includes a cylinder-like or block-like rubber part 41 that is disposed about the pin 33 between the projecting part 17 and the flywheel 1. Compression of the rubber part 41 produces a biasing force in a manner similar to the coil spring 34.

Seventh Embodiment

Figure 8:
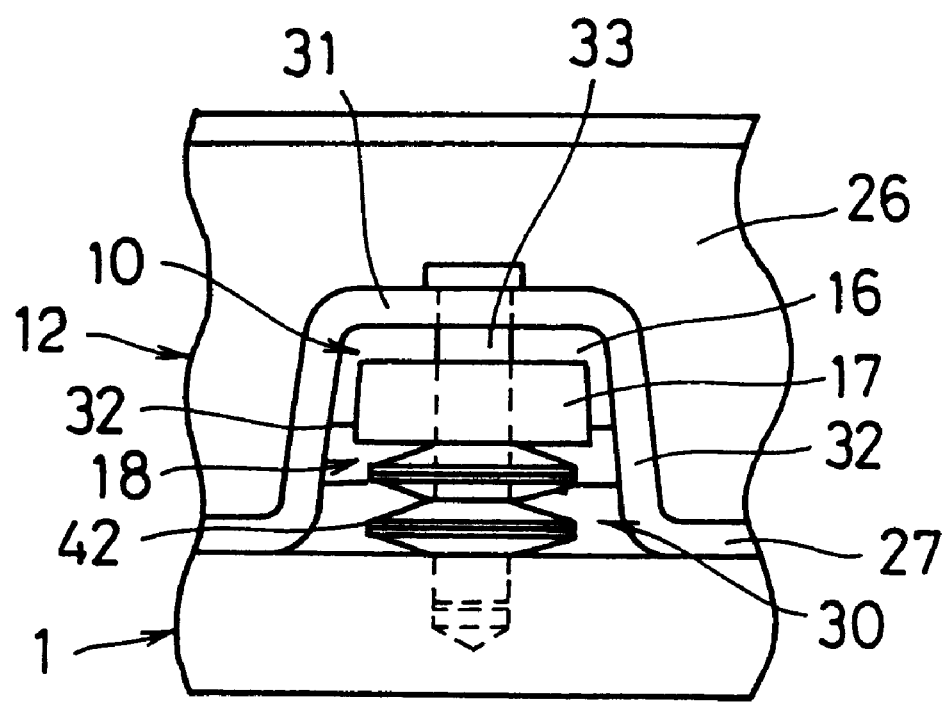
FIG. 8 is a fragmentary view similar to FIG. 2 showing a seventh embodiment of the present invention.

A seventh embodiment is shown in FIG. 8. In the seventh embodiment, the coil spring 34 is again omitted and instead a biasing force is provided by a plurality of disc springs 42 that are placed between the projecting part 17 and the flywheel 1 in series. In another words, the disc springs 42 are aligned in an alternating manner such that larger ends contact a corresponding larger end of an adjacent disc spring 42 and smaller ends contact a corresponding smaller end of an adjacent disc spring 42. The pin 33 extends through an aperture formed in each disc spring 42.

As described above, instead of the usual strap plate which extends in a direction tangent to the clutch, the present invention uses a connecting part which has relatively small circumferential length when compared to strap plates. Since the size of the opening is small compared to the prior art, the strength of the clutch cover is increased compared to the prior art.

As the result, the deformation and damage of the clutch cover are minimized, and the variations in the performance of the clutch cover assembly during engagement and disengagement operations the clutch are also minimized due to the reduced possibility of deformation of the clutch cover.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

Some of the reference numbers in figures are as follows:

| | |
|---|---|
| 1: | flywheel |
| 2: | clutch disk assembly |
| 3: | clutch cover assembly |
| 10: | pressure plate |
| 11: | diaphragm spring |
| 12: | clutch cover |
| 15: | friction surface |
| 17: | projecting part |
| 21: | clip |
| 30: | opening |
| 33: | pin |
| 34: | coil spring |
| 40: | plate spring |
| 41: | rubber part |
| 42: | disc spring |

What is claimed is:

1. A clutch cover assembly connected to a flywheel in a clutch mechanism, comprising:

a clutch cover fixed to said flywheel, a pressure plate disposed inside said clutch cover, said pressure plate formed with a friction surface facing said flywheel;

a connecting element which extends in a generally axial direction relative to an axis of rotation of said clutch cover and said flywheel, a first end of said connecting element being connected to said flywheel and a second end of said connecting element being supported by said clutch cover, said connecting element extending through a portion of said pressure plate, said connecting element contacting said pressure plate restricting relative rotation between said clutch cover, said flywheel and said pressure plate, and allowing axial movement of said pressure plate with respect to said clutch cover;

a diaphragm spring disposed in said clutch cover between said clutch cover and said pressure plate, said diaphragm spring biasing said pressure plate toward said flywheel; and a releasing mechanism supported in said clutch cover, said releasing mechanism configured to bias said pressure plate away from said flywheel in response to movement of said diaphragm spring wherein said connecting element provides support for said pressure plate in transmission of torque between said clutch cover and said flywheel, and said pressure plate.

2. The clutch cover assembly as set forth in claim 1, wherein said connecting element is a pin which extends in an axial direction and extends into an opening formed in the flywheel.

3. The clutch cover assembly as set forth in claim 1, wherein said connecting element is a pin which extends in an axial direction and extends through an opening formed in said clutch cover and said pin is caulked against one surface of said clutch cover.

4. The clutch cover assembly as set forth in claim 1, wherein said portion of said pressure plate is a radially extending portion formed with an aperture, said connecting element extending through said aperture.

5. The clutch cover assembly as set forth in claim 1, wherein said clutch cover is formed with a depression and one end of said connecting element is retained in said depression.

6. The clutch cover assembly as set forth in claim 1, wherein said connecting element is a pin fixed to said clutch cover and said pin is configured to extend into a hole formed in the flywheel, said releasing mechanism comprises an elastic element disposed about said pin biasing said pressure plate away from the flywheel.

7. The clutch cover assembly as set forth in claim 6, wherein said elastic element is a coil spring.

8. The clutch cover assembly as set forth in claim 6, wherein said elastic element is a rubber-like block formed with an aperture through which said pin extends.

9. The clutch cover assembly as set forth in claim 6, wherein said elastic element is an undulated spring formed with a plurality of apertures through which said pin extends.

10. The clutch cover assembly as set forth in claim 6, wherein said elastic element comprises a plurality of conical springs stacked end to end such that a large end of one of said conical springs engages a large end of an adjacent one of said conical springs and a small end of one of said conical springs engages a small end of one of said conical springs.

11. The clutch cover assembly as set forth in claim 1, wherein said connecting element is a pin fixed to said clutch cover and said pin is configured to extend into a hole formed in the flywheel, said releasing mechanism comprises a clip fixed to said pressure plate, said clip extending around a portion of said diaphragm spring such that movement of said diaphragm spring and movement of said pressure plate are synchronous due to engagement with said clip.

12. The clutch cover assembly as set forth in claim 1, wherein outer circumferential portions of said clutch cover are formed with at least one opening open to a radially outward side of said clutch cover, and said portion of said pressure plate extends into said opening.

* * * * *